(12) United States Patent
Yocam et al.

(10) Patent No.: US 9,775,039 B2
(45) Date of Patent: Sep. 26, 2017

(54) DATA STITCHING FOR NETWORKED AUTOMATION

(71) Applicant: T-Mobile USA, Inc., Bellevue, WA (US)

(72) Inventors: Eric W. Yocam, Sammamish, WA (US); Ahmad Arash Obaidi, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 374 days.

(21) Appl. No.: 14/546,902

(22) Filed: Nov. 18, 2014

(65) Prior Publication Data

US 2016/0142916 A1 May 19, 2016

(51) Int. Cl.
*H04W 12/08* (2009.01)
*H04W 4/02* (2009.01)
*H04W 12/06* (2009.01)
*G06Q 20/32* (2012.01)
*G06Q 20/40* (2012.01)

(52) U.S. Cl.
CPC ........ *H04W 12/08* (2013.01); *G06Q 20/3224* (2013.01); *G06Q 20/4016* (2013.01); *H04W 4/021* (2013.01); *H04W 12/06* (2013.01)

(58) Field of Classification Search
CPC combination set(s) only.
See application file for complete search history.

(56) References Cited

U.S. PATENT DOCUMENTS

| 7,917,963 | B2* | 3/2011 | Goyal | G06F 21/6209 726/29 |
| 8,244,216 | B1* | 8/2012 | Becker | G06Q 20/32 455/410 |
| 8,295,898 | B2 | 10/2012 | Ashfield | |
| 8,321,916 | B2* | 11/2012 | Aissi | G06F 21/6209 726/35 |
| 8,364,746 | B2* | 1/2013 | Annamalai | H04W 4/02 455/404.2 |
| 8,448,236 | B1* | 5/2013 | Odom | H04L 63/0407 726/14 |

(Continued)

OTHER PUBLICATIONS

"International Search Report and Written Opinion" for Application No. PCT/US2015/059352 mailed Feb. 15, 2016, 9 pages.

*Primary Examiner* — Peter Poltorak
(74) *Attorney, Agent, or Firm* — Han Santos, PLLC; Elliott Y. Chen

(57) ABSTRACT

A telecommunication carrier may stitch data from multiple sources to support device automation and access control. A state may be assigned to a user of a user device at a telecommunication carrier based on a data stitch of information from multiple data sources. The data sources may include data on a geolocation of the user device. The state may be provided to a rules engine at a remote location via a carrier network of the telecommunication carrier. An indication from the rules engine that the user device is granted or denied access to one or more entities at the location based on the state may be received via the carrier network at the telecommunication carrier. In turn, the telecommunication carrier may provide the indication of the granted or denied access to the user device of the user.

20 Claims, 7 Drawing Sheets

(56) References Cited

U.S. PATENT DOCUMENTS

| | | | | |
|---|---|---|---|---|
| 8,484,700 B2* | 7/2013 | Hulten | H04L 63/102 | 726/3 |
| 8,532,069 B2* | 9/2013 | Balwani | H04W 8/245 | 370/338 |
| 8,839,453 B2* | 9/2014 | Sanjeev | H04L 63/107 | 713/182 |
| 8,953,620 B2* | 2/2015 | Caldwell | H04M 15/00 | 370/338 |
| 9,117,204 B2* | 8/2015 | Hubner | G06Q 10/1093 | |
| 9,253,198 B2* | 2/2016 | Hughes, Jr. | H04L 63/105 | |
| 9,369,457 B2* | 6/2016 | Grajek | G06F 17/30876 | |
| 9,449,164 B2* | 9/2016 | Ramallo | G06F 21/6245 | |
| 2002/0177449 A1* | 11/2002 | McDonnell | G06F 21/00 | 455/456.1 |
| 2003/0236120 A1* | 12/2003 | Reece | A63F 13/12 | 463/42 |
| 2004/0076120 A1* | 4/2004 | Ishidoshiro | H04W 12/06 | 370/252 |
| 2005/0018620 A1* | 1/2005 | Berndt | H04L 29/12009 | 370/254 |
| 2005/0044156 A1* | 2/2005 | Kaminski | H04L 63/08 | 709/206 |
| 2005/0091213 A1* | 4/2005 | Schutz | G06F 21/32 | |
| 2006/0041746 A1* | 2/2006 | Kirkup | G06F 21/35 | 713/168 |
| 2008/0026767 A1* | 1/2008 | Krstulich | H04L 63/104 | 455/452.2 |
| 2009/0217348 A1* | 8/2009 | Salmela | H04L 63/08 | 726/2 |
| 2009/0254975 A1 | 10/2009 | Turnbull | | |
| 2011/0030037 A1* | 2/2011 | Olshansky | H04L 12/4641 | 726/4 |
| 2011/0241872 A1 | 10/2011 | Mahaffey | | |
| 2012/0077488 A1* | 3/2012 | Unger | H04W 48/18 | 455/432.1 |
| 2012/0108208 A1* | 5/2012 | Willis | H04L 63/0853 | 455/411 |
| 2013/0275303 A1 | 10/2013 | Fiore | | |
| 2013/0332358 A1* | 12/2013 | Zhao | G06Q 20/12 | 705/44 |
| 2014/0032651 A1* | 1/2014 | Singh | H04L 67/10 | 709/203 |
| 2014/0033326 A1* | 1/2014 | Chien | H04W 12/08 | 726/28 |
| 2014/0149294 A1* | 5/2014 | Leevendig | G06Q 20/02 | 705/71 |
| 2014/0214668 A1* | 7/2014 | Lotter | H04L 63/20 | 705/41 |
| 2014/0279411 A1* | 9/2014 | Bertanzetti | G06Q 20/3224 | 705/39 |
| 2014/0330944 A1* | 11/2014 | Dabbiere | H04W 4/001 | 709/220 |
| 2015/0035645 A1* | 2/2015 | Gaddam | G07C 9/00111 | 340/5.61 |
| 2015/0073980 A1* | 3/2015 | Griffin | H04W 4/008 | 705/39 |
| 2015/0087303 A1* | 3/2015 | Hillary | H04W 4/021 | 455/435.1 |
| 2015/0111524 A1* | 4/2015 | South | H04W 4/021 | 455/404.2 |
| 2015/0229751 A1* | 8/2015 | Scott | G06F 1/1632 | 455/414.1 |
| 2015/0244706 A1* | 8/2015 | Grajek | H04W 12/06 | 726/6 |
| 2016/0021238 A1* | 1/2016 | Abramson | H04W 48/04 | 455/418 |
| 2016/0044574 A1* | 2/2016 | Naqvi | H04W 4/001 | 455/410 |
| 2016/0105631 A1* | 4/2016 | Alberth, Jr. | H04N 5/77 | 348/159 |
| 2016/0134624 A1* | 5/2016 | Jacobson | H04W 12/06 | 726/4 |
| 2016/0164972 A1* | 6/2016 | Collins | H04L 67/12 | 702/188 |
| 2016/0255493 A1* | 9/2016 | Lihosit | H04W 8/183 | 455/419 |

\* cited by examiner

DATA STITCHING FOR NETWORKED AUTOMATION

BACKGROUND

User devices, such as smartphones, tablet computers, and embedded computing devices may continuously or periodically provide their locations to a telecommunication carrier. The user devices may provide their locations as the users of the user devices roam between multiple places. The location information provided by the user devices to the telecommunication carrier may be used by the telecommunication carrier to improve network coverage. Further, applications installed on a user device may also use location data to provide location-specific advertisements or location-based information to the user of the user device. While such ad hoc uses of location information by different entities may provide some benefit to the users of user devices, such uses do not significantly alter the way that the users interact with their user devices.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
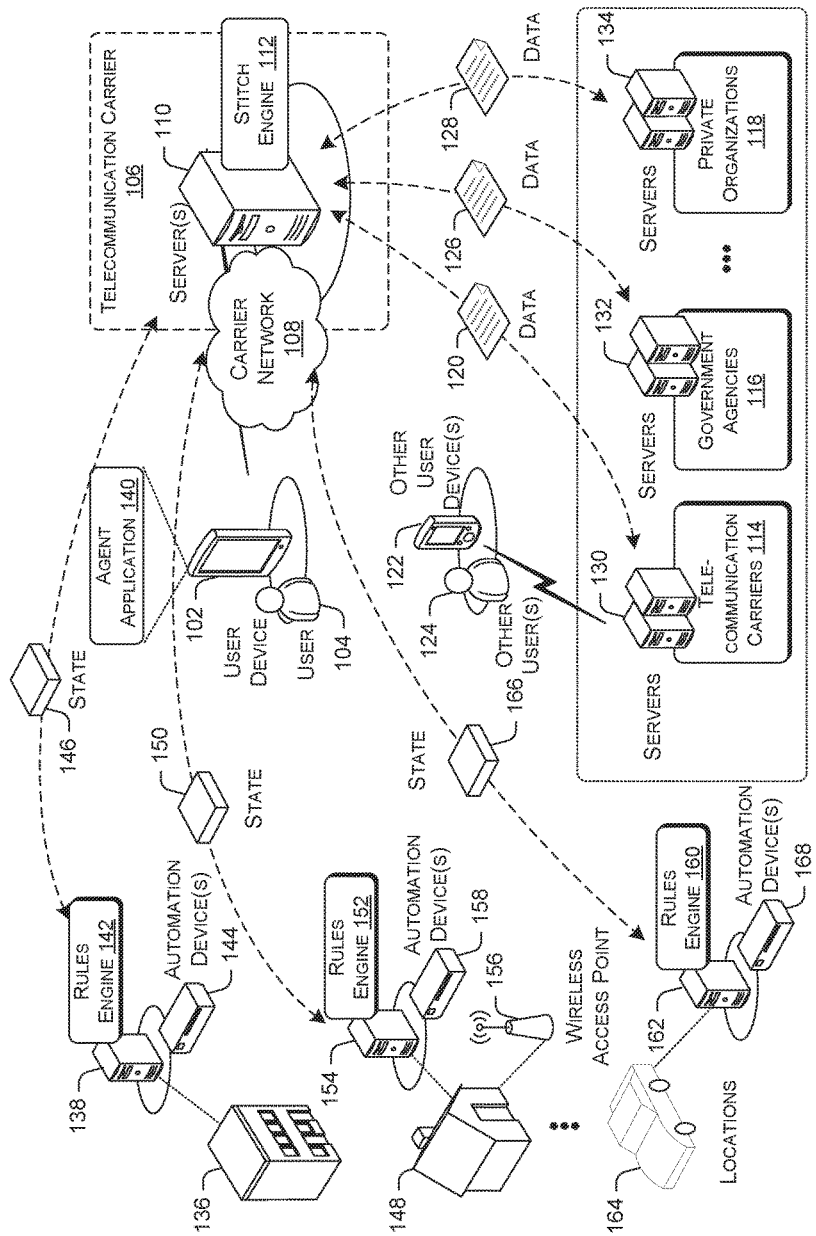
FIG. 1 illustrates an example network architecture for implementing data stitching for networked automation.

This disclosure is directed to techniques for using data stitched from various data sources to determine whether a user of a user device is to be granted or denied access to one or more entities. In some instances, the one or more entities may include hardware or software resources on the user device. In other instances, the one or more entities may include hardware or software resources at different locations that are in proximity to the user device. In various embodiments, the data sources may include data that are stored at telecommunication carriers, government agencies, and private organizations. For example, the data from a telecommunication carrier may include a geolocation of the user device with respect to a place or other user devices. The data from government agencies may include data on public threats and crimes. The data from private organizations may include employee data resource access policies.

In some embodiments, a data stitch engine at a telecommunication carrier may aggregate the data from these data sources to generate a state for the user of the user device relative to the one or more entities. Rules engines that control access to the one or more entities may subsequently take actions to grant or limit access based on the state of the user. In this way, the rules engines may perform device automation, automated facility access control, and automated data access control with respect to the user. In alternative embodiments, rules engines may also provide alerts to the user device, other user devices, the government agencies, and/or private organizations based on a current location of the user device. For instance, the rules engines may provide alerts in the event the aggregated data from the multiple data sources indicate that the user of the user device is under threat from the users of other user devices.

In at least one embodiment, a state may be assigned to a user of a user device at a telecommunication carrier based at least on a data stitch of information from multiple data sources. The data sources may include data on a geolocation of the user device. The state may be provided to a rules engine at a remote location via a carrier network of the telecommunication carrier. An indication from the rules engine that the user device is granted or denied access to one or more entities at the location based on the state may be received via the carrier network at the telecommunication carrier. In turn, the telecommunication carrier may provide the indication of the granted or denied access to the user device of the user.

The techniques may enable a telecommunication carrier to act as an information aggregator and distributor for device users. By aggregating information from multiple data sources, analyzing the information, and distributing the analyzed information to multiple entities, the telecommunication carrier may support various forms of automations. These forms of automation may include machine-to-machine automation, automated access control, and automated alerts. These forms of automations may provide additional convenience as the device users perform daily tasks. These forms of automation may also shelter the device users from harm, as well as protect individuals or organizations that encounter the device users. In order to safeguard the privacy of a device user, the telecommunication carrier may take on the role of an information aggregator and distributor for a device user upon receiving explicit permission from the device user. The techniques described herein may be implemented in a number of ways. Example implementations are provided below with reference to the following figures.

Example Network Architecture

FIG. 1 illustrates an example network architecture 100 for implementing data stitching for networked automation. The network architecture 100 may include a user device 102 that is operated by a user 104. The user device 102 may be a smartphone, a tablet computer, an embedded computer system, or any other device that is capable of using wireless communication services that are provided by a telecommunication carrier 106. The telecommunication carrier 106 may operate a carrier network 108. The carrier network 108 may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth.

The carrier network 108 may include base stations and a core network. The base stations are responsible for handling voice and data traffic between user devices, such as the user device 102, and the core network. The core network may provide telecommunication and data communication services to multiple user devices. For example, the core network may connect the user device 102 to other telecommunication and data communication networks, such as the Internet. In various embodiments, the core network may include one or more servers 110. The one or more servers 110 may implement a stitch engine 112.

The stitch engine 112 may aggregate data from various data sources. Such data sources may include one or more other telecommunication carriers 114, government agencies 116, and private organizations 118. The data 120 provided by the other telecommunication carriers 106 may include the geolocations of the user devices belonging to users of the other telecommunication carriers 106, as well as the identification information of the users. For example, such user devices may include the one or more user devices 122 that are used by the one or more users 124. The data may be shared between the telecommunication carrier 106 and the other telecommunication carriers 106 through a mutual carrier data sharing agreement.

The government agencies 116 may include various law enforcement agencies, judicial government branches, regulatory and administration agencies, etc. These government agencies 116 may provide data 126 such as all-points bulletins (APBs) on suspects and persons of interest, crime alerts for multiple geographical areas, criminal histories of individuals, court mandated orders (e.g., restraining orders, warrants, probation orders, etc.) pertaining to individuals, civil violations committed by individuals, vital statistics of individuals, property ownership records individuals, and/so forth. The private organizations 118 may include financial institutions (e.g., banks, lenders, credit reporting agencies, etc.), businesses, schools, transportation carriers, retailers, and so forth. These private organizations 118 may provide data 128 that includes credit card transaction histories of individuals, employment information of individuals, education background of individuals, and so forth. Each of the data sources may use one or more servers that communicate with the servers 110 to transmit data to the stitch engine 112 and receive data from the stitch engine 112. For example, the telecommunication carriers 106 may employ the servers 130, the government agencies 116 may employ the servers 132, and the private organizations may employ the servers 134. Additionally, the stitch engine 112 may also access geolocation information of device users that use the carrier network 108. In various embodiments, the stitch engine 112 may access the data related to a device user from the data sources after obtaining explicit consent from the device user.

The stitch engine 112 may stitch data pertaining to a device user from the one or more data sources to generate a current state for the device user. The state of a device user may be a summation of multiple characteristics that are possessed by and/or associated with the device user at a particular moment in time. These characteristics may include personal characteristics, professional characteristics, geolocation characteristics, legal characteristics, demographical characteristics, environmental characteristics, and/or other characteristics. The current state may serve as a basis for action by a user device operated by the device user or a rules engine. For example, the user 104 carrying the user device 102 may be approaching a workplace 136 of the user 104. The workplace 136 may be one of the private organizations 118. An agent application 138 on the user device 102 may report the location of the user device 102 to the stitch engine 112. The stitch engine 112 may query the computing device 138 at the workplace 136 to determine that the user 104 is a valid employee of the workplace 136. The stitch engine 112 may further query a government regulatory agency to determine that the user 104 is certified to perform his job at the workplace 136. Accordingly, the stitch engine 112 may send such a current state 146 of the user 104 to a rules engine 142 on the computing device 138. The current state 146 may arrive at the computing device 138 via the carrier network 108 and/or a third-party network. Accordingly, the rules engine 142 may configure one or more automation devices 144 for the impending arrival of the user 104 to the workplace 136. For example, the rules engine 142 may cause automated window blinds in the office of the user 104 to open, a programmable thermostat in the office to heat or cool the office to a temperature desirable to the user 104, an office computer used by the user 104 to automatically boot up, and so forth.

However, if the current state 146 of the user 104 as provided by the stitch engine indicates that the user 104 is no longer employed at the workplace 136, the rules engine 142 may activate an automation device in the form of a alert message generator to inform security personnel at the workplace 136 to prevent the user 104 from entering the workplace 136. Additionally, the stitch engine 112 may also send the current state to the agent application 138 on the user device 102. In turn, the agent application 138 may decide to trigger applications on the user device 102 to automatically delete proprietary information (e.g., company credit card information, financial statements, work-related email messages, confidential documents, etc.) from the user device 102. In some alternative embodiments, rather than depending on the agent application 138 to make a decision to take action, the stitch engine 112 may make the decision to delete the proprietary information, and direct the agent application 138 to command the application on the user device 102 to do so.

In another example, the user 104 carrying the user device 102 may be near a front entrance of a private residence 148, but has forgotten to bring keys to the residence. The private residence 148 may belong to a relative of the user 104 who is away. The agent application 138 on the user device 102 may report the location of the user device 102 and the identity of the user 104 to the stitch engine 112. Sensing that the user device 102 has loitered at the private residence 148 for a predetermined amount of time, the stitch engine 112 may check with a database of a security company that is responsible for providing security services for the residence. The database of the security company may indicate that the user 104 has access privileges to the private residence 148 even when the owner is away. The stitch engine 112 may further check with a database of a local law enforcement agency and verify that the user 104 is not the subject of a warrant or APB by law enforcement.

The stitch engine 112 may pass this current state 150 of the user 104 to a rules engine 152. The rules engine 152 may be implemented by a computing device 154 that is part of the home automation system of the private residence 148. In some instances, the stitch engine 112 may transmit the current state 150 to the rules engine 152 via the carrier network 108 and/or a third-party network. In other instances, the stitch engine 112 may transmit the current state 150 to the rules engine 152 via a wireless access point 156 (e.g., Wi-Fi access point) that is installed at the private residence 148. The wireless access point 156 may be a mobile hotspot that is supplied by the telecommunication carrier 106.

The rules engine 152 may activate one or more automation devices 158 at the private residence 148 based on the current state of the user 104. For example, the rules engine 152 may automatically unlock an electronic lock at the front door of the residence, and may also disable a security system. In some instances, the rules engine 152 may also generate an alert message regarding the presence of the user 104 at the residence and transmit the message to a user device belonging to the owner of the residence. In some embodiments, prior to performing such actions, the rules engine 152 may also communicate with the agent application 138 to authenticate the user 104. For example, the rules engine 152 may cause the agent application 138 to prompt the user for authentication information (e.g., a passcode), and perform the actions to provide the user 104 with access to the residence after the authentication information is validated.

In a contrasting example, a user 124 of a user device 122 may be loitering near the private residence 148. The stitch engine 112 of the telecommunication carrier 106 may be informed of the location of the user 124 by another telecommunication carrier that services the user device 122. The stitch engine 112 may check the database of the database of the security company and determines that the owner of the private residence 148 designated the user as an unwanted person. Further, a check of a government agency database may indicate that the owner of the private residence 148 has a judicial restraining order against the user 124. The stitch engine 112 may determine from the reported location of the user 124 that the user 124 is in violation of the restraining order. The stitch engine 112 may provide such findings as a current state of the user 124 to the rules engine 152.

Upon being informed of a current state of the user 124, the rules engine 152 may cause an automation device to automatically alert the security company or a law enforcement agency of the presence of the user 124 near the residence. Automated door locks at entrances to the residence may be trigger by the rules engine 152 to lock. Additionally, the rules engine 152 may also generate an alert message regarding the presence of the user 124 near the residence and transmit the message to a user device belonging to the owner of the residence. In instances in which a user device is equipped with an agent application, the alert message may be displayed by the agent application. Otherwise, the alert message may be a text message that is displayed by a messaging application on the device.

In other embodiments, rules engines may be installed on embedded computing devices. For example, a rules engine 160 may be implemented by an embedded computing device 162. The embedded computing device 162 may be installed on a vehicle 164. In such an example, the user 104 carrying the user device 102 may be sitting in the vehicle 164. The agent application 138 on the user device 102 may report the location of the user device 102 to the stitch engine 112. The stitch engine 112 may check data from multiple databases. For example, the stitch engine 112 may check an insurance company database to ensure that the user 104 has valid insurance coverage. The stitch engine 112 may also check a government licensing database to ensure that the user 104 has a valid driver's license. The stitch engine 112 may then transmit a state 166 that includes the insurance coverage status and driver's license status of the user 104 to the rules engine 160. The stitch engine 112 may transmit the state 166 using the carrier network 108 and/or a third party network. Accordingly, if the rules engine 160 determines the user 104 is not authorized to use the vehicle, if the user 104 does not have insurance coverage, or if the user 104 does not have a valid driver's license, the rules engine 160 may cause automation devices 168 in the vehicle 164 to disable the engine and/or display a alert of usage denial to the user 104.

Accordingly, the stitch engine 112 of the telecommunication carrier 106 may use multiple sources of data to provide convenience to device users as they perform daily tasks. The stitch engine 112 may also cooperate with multiple rules engines to shelter device users from harm, as well as protect individuals or organizations that encounter the device users.

Example User Device Components

Figure 2:
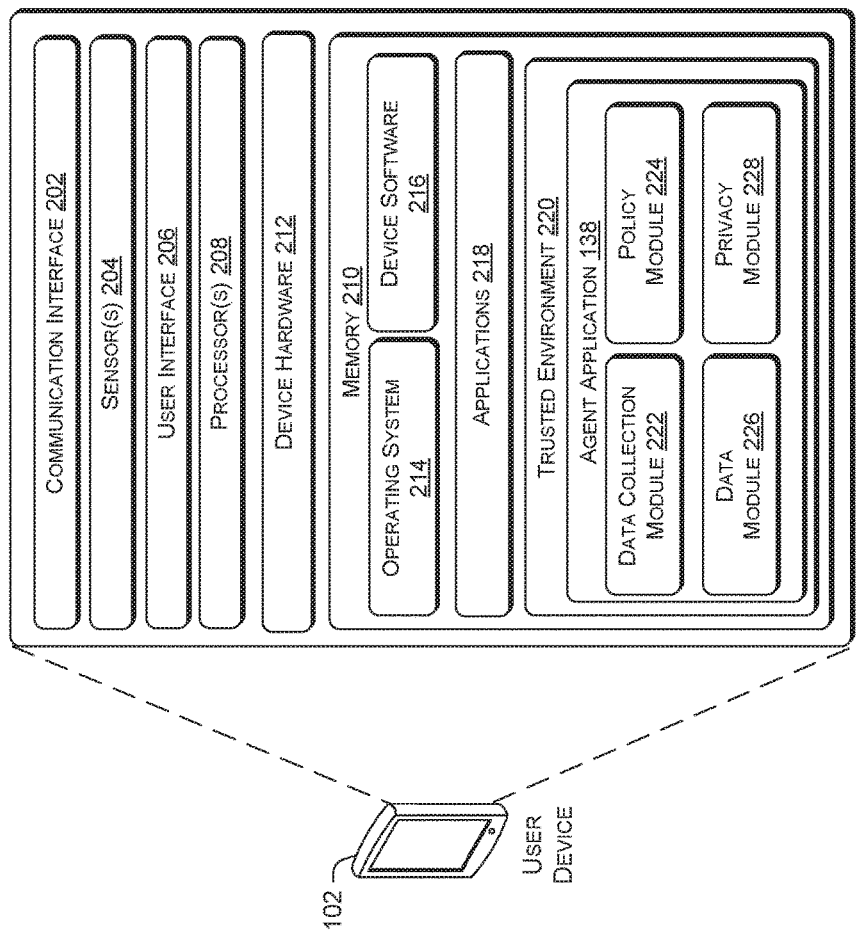
FIG. 2 is a block diagram showing various components of an illustrative user device that supports networked automation.

FIG. 2 is a block diagram showing various components of an illustrative user device 102 that supports networked automation. The user device 102 may include a communication interface 202, one or more sensors 204, a user interface 206, one or more processors 208, and memory 210.

The communication interface 202 may include wireless and/or wired communication components that enable the electronic device to transmit or receive voice or data communication via the carrier network 108, as well as other telecommunication and/or data communication networks. The sensors 204 may include a proximity sensor, a compass, an accelerometer, and/or a global positioning system (GPS) sensor. The proximity sensor may detect movement of objects that are proximate the user device 102. The compass, the accelerometer, and the GPS sensor may detect orientation, movement, and geolocation of the user device 102.

The user interface 206 may enable a user to provide inputs and receive outputs from the user device 102. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The device hardware 212 may include other hardware that is typically located on a user device. For example, the device hardware 212 may include signal converters, antennas, modems, hardware decoders and encoders, graphic processors, a SIM card slot, and/or the like that enable the user device 102 to execute applications and provide telecommunication and data communication functions. A SIM card may be inserted into the SIM card slot of the user device 102. Accordingly, the SIM card may enable the user device 102 to obtain telecommunication and/or data communication services from the telecommunication carrier 106.

The one or more processors 208 and the memory 210 of the user device 102 may implement an operating system 214, device software 216, and one or more applications 218. The operating system 214 may include components that enable the user device 102 to receive and transmit data via various interfaces (e.g., user controls, communication interface 202, and/or memory input/output devices). The operating system 214 may also process data using the one or more processors 208 to generate outputs based on inputs that are received via the user interface 206. For example, the operating system 214 may provide an execution environment for the execution of the applications 218. The operating system 214 may include a presentation component that presents the output (e.g., display the data on an electronic display, store the data in memory, transmit the data to another electronic device, etc.).

The operating system 214 may include an interface layer that enables applications to interface with a modem of the user device 102. Additionally, the operating system 214 may include other components that perform various other functions generally associated with an operating system. The device software 216 may include software components that enable the user device to perform functions and control hardware components of the user device 102. For example, the device software 216 may include basic input/output system (BIOS), bootrom, or a bootloader that boots up the user device 102 and executes the operating system 214 following power up of the device.

The applications 218 may include applications that provide utility, entertainment, and/or productivity functionalities to a user of the user device 102. For example, the applications 218 may include telephony applications, electronic mail applications, remote desktop applications, web browser applications, navigation applications, office productivity applications, multimedia streaming applications, and/or so forth.

The one or more processors 208 and the memory 210 of the user device 102 may further implement a trusted environment 220. The trusted environment 220 is an isolated execution space that is provided by dedicated software and/or hardware of a device. For example, the trusted environment 220 may employ a dedicated memory space or memory chip that is not accessible by applications and/or hardware components not located in the dedicated memory space or memory chip, unless special access privileges are provided to such applications and/or hardware components through secure communication channels. The agent application 138 may execute in the trusted environment 220. The agent application 138 may include a data collection module 222, a policy module 224, a data distribution module 226, and a privacy module 228. These modules may include routines, program instructions, objects, and/or data structures that perform particular tasks or implement particular abstract data types.

The data collection module 222 may collect information from the sensors 204 of the user device 102. In some embodiments, the data collection module 222 may collect geolocation, movement, and/or acceleration information from the sensors 204. Such information may be provided to the stitch engine 112, as well as passed on to one or more other entities. For example, the geolocation information collected by the data collection module 222 may be passed on to a credit card company to repudiate a presumption that the user 104 made a purchase at a certain brick-and-mortar retail store. The geolocation information may show that the user 104 was not at a physical location of the retail store at a time the purchase was made.

The data collection module 222 may also collect information from the applications 218 that are installed on the user device 102. For example, the data collection module 222 may collect information from a banking application that is installed on the user device 102. The information collected from the banking application may assist the stitch engine 112 in detecting fraudulent fund transfers or purchases. In various embodiments, the applications 218 may have application programming interfaces (APIs) that can be invoked by the data collection module 222 to obtain information. The information collected by the data collection module 222 may conform to a data format standard that is developed by the telecommunication carrier 106.

The policy module 224 may control the software on the user device 102 based on state information received from the stitch engine 112. For example, the stitch engine 112 may provide state information that indicates the user 104 of the user device 102 has ended his employment at the workplace 136. In response, the policy module 224 may configure a work email application on the user device 102 to block the user 104 from access work email, as well as purge all emails from the memory 210 of the user device 102. In another example, the policy module 224 may cause an authentication application on the user device 102 to prompt the user 104 for a security code for disarming a security system of the private residence 148 when the user device 102 is near the location of the residence.

The data distribution module 226 may upload data to the stitch engine 112, as well as receive data from the stitch engine 112. The data may include information that is collected from the hardware and software components of the user device 102 by the data collection module 222. The data may also include information that is manually entered into the applications 218. The received data may include user state information that is destined for the policy module 224, such that the policy module 224 may control the software of the user device 102.

The privacy module 228 may provide a user interface that enables the user to select or unselect the type of information that may be collected by the data collection module 222. For example, the user interface may provide a list of applications and sensors on the user device 102. The list may include checkboxes that allow a user to designate applications and sensors from which information may be collected by the data collection module 222. Conversely, the user 104 may use the list to disable all data collection by the data collection module 222. In this way, the privacy of the user 104 may be protected by the privacy module 228. In other embodiments, the user may use the privacy module 228 to request and view audit reports regarding the distribution of user state information to various governmental and private organizations.

While the agent application 138 is illustrated as being implemented in the trusted environment 220, the agent application 138 may be implemented elsewhere in the memory 210 of the user device 102 in other embodiments. For example, the agent application 138 may be implemented as one of the application 218 or as a part of the operating system 214.

Example Server Components

Figure 3:
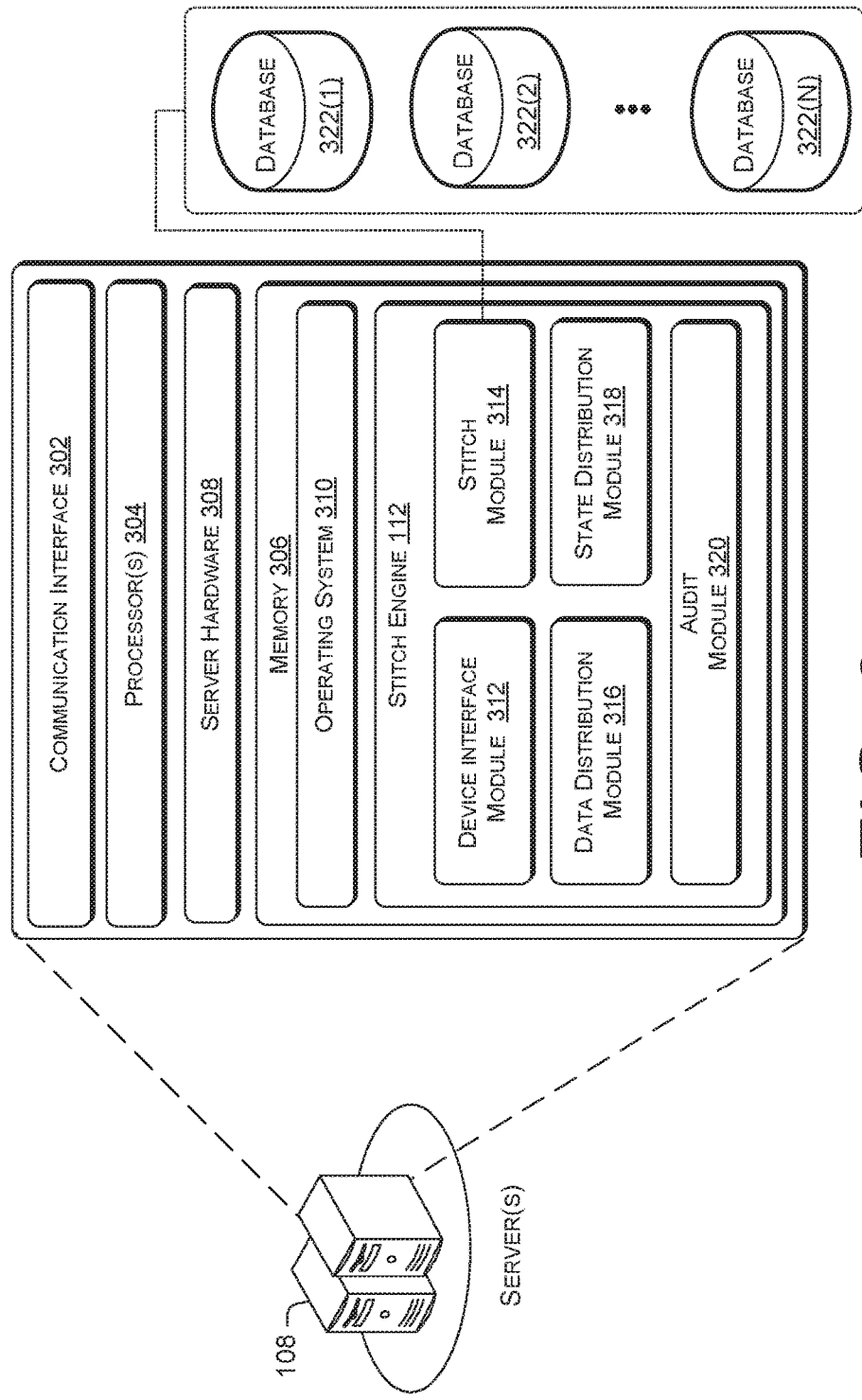
FIG. 3 is a block diagram showing various components of servers at a telecommunication carrier that support data stitching for networked automation.

FIG. 3 is a block diagram showing various components of servers at a telecommunication carrier that support data stitching for networked automation. The one or more servers 110 may include a communication interface 302, one or more processors 304, memory 306, and server hardware 308. The communication interface 302 may include wireless and/or wired communication components that enable the servers to transmit data to and receive data from other networked devices via the carrier network 108. The server hardware 308 may include additional hardware that performs user interface, data display, data communication, data storage, and/or other server functions.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The processors 304 and the memory 306 of the servers 110 may implement an operating system 310 and the stitch engine 112. The operating system 310 may include components that enable the servers 110 to receive and transmit data via various interfaces (e.g., user controls, communication interface, and/or memory input/output devices), as well as process data using the processors 304 to generate output. The operating system 310 may include a presentation component that presents the output (e.g., display the data on an electronic display, store the data in memory, transmit the data to another electronic device, etc.). Additionally, the operating system 310 may include other components that perform various additional functions generally associated with an operating system.

The stitch engine 112 may include a device interface module 312, stitch module 314, a data distribution module 316, a state distribution module 318, and an audit module 320. These modules may include routines, program instructions, objects, and/or data structures that perform particular tasks or implement particular abstract data types.

The device interface module 312 may receive data from multiple user devices, such as the user device 102. The data may include information that is gathered by the agent applications (e.g., agent application 138) on those user devices. For example, the data may include the geolocations, orientations, and movements of the user devices. Additionally, the data may also include information that are manually entered by the users of the user devices, such as authentication information (e.g., biometric data, password), privacy settings with respect to data collection, and so forth.

The stitch module 314 may aggregate and analyze data from multiple data sources to develop states of device users. In various embodiments, the data may include information that are collected from the multiple user devices that subscribe to the telecommunication and data communication services offered by the telecommunication carrier 106. The data may further include data from the databases 322(1)-322(N). The databases 322(1)-322(N) may belong to various entities, such as the telecommunication carriers 106, the government agencies 116, and the private organizations 118. By aggregating the data related to a device user from multiple data sources at a point in time, the stitch module 314 may compile a state for the device user for that point. In some embodiments, the stitch module 314 may develop a state for a device user when a trigger event occurs. For example, the trigger event may be the user device of a user indicating that the user has entered a particular area, is within a certain distance of a particular location, or has remained in a particular area or at a particular location for a predetermined period of time. In other embodiments, the stitch module 314 may develop states for a device user on a periodic basis, such as on an hourly, daily, or weekly basis.

In some embodiments, the stitch module 314 may develop tailored states of a device user for different rules engines. For example, a rules engine at the workplace 136 may desire to know whether a professional license of the user 104 is valid and whether the user 104 has been arrested for any crimes. However, a rules engine 160 in the vehicle 164 may want to know whether the driver's license of the user 104 is valid and whether the user 104 has automobile insurance coverage. Accordingly, the rules engines may register in advance with the stitch module 314 the types of data they would like to receive in a report of user state. The stitch module 314 may maintain a database of rules engine identities and their state report information parameters. However, in other embodiments, the stitch module 314 may distribute states in which each state contains a set of common types of information, and rules engines may select the type of state information to process and discard the remaining information. In still other embodiments, the stitch module 314 may develop different types of states for different classes of rules engines (e.g., workplace class, home class, vehicle class, etc.). Each type of state may contain a list of information that a particular class of rules engines is likely to use.

The stitch module 314 may use adapters to obtain data from the multiple databases 322(1)-322(N). In some instances, the adapters may function to convert the data from each of the multiple database 322(1)-322(N) to a common data format. In instances in which the data from a database is encrypted for secure transmission to the stitch engine 112, the adapters may decrypt the data from the database. The adapters may perform filtering function to ensure that irrelevant or duplicate data from the multiple databases 322(1)-322(N) are discarded during data stitching. For example, each of the adapters may have an associated schema, and the stitch module 314 may use a master stitch schema to map out data in duplicate or irrelevant data fields while mapping together the data in the unique data fields. The schemas may share a common data format, such as the Extensible Markup Language (XML) format, the JavaScript Object Notation (JSON) format, etc.

The stitch module 314 may use other adapters to query against the stored stitched data to retrieve a user state. For example, when a query is executed for a particular user state, the stitch module 314 may identify a corresponding adapter for each data field that stores information for the particular user state. The stitch module 314 may use the identified adapters to retrieve the data in the data fields and return the data records as the particular user state.

The data distribution module 316 may route data between the agent applications on the multiple user devices and various rules engines. For example, a rules engine may request that a user of a user device provide authentication information to the rules engine for the purpose of activating an automation device. In such an example, the data distribution module 316 may receive the authentication request from the rules engine and route the request to the user device of the user. Once the user has provided the authentication information, the data distribution module 316 may route the authentication information to the rules engine. The data distribution module 316 may further route any reporting messages related to the success or failure of the authentication (e.g., an access granted message) to the user device.

In some embodiments, the data distribution module 316 may also provide information on the device users to a particular organization in response to a legitimate request. For example, a law enforcement agency investigating a bank robbery may request the identities of device users that are in a designated area around the bank at a particular time. Once the law enforcement agency has provided the appropriate court order or warrant, an administrator of the stitch engine 112 may activate the data distribution module 316 to provide the request data to the law enforcement agency. Accordingly, the data distribution module 316 may use an access control list to perform the data distribution. The access control list may set policies on the type and amount of data, prerequisite conditions for distribution (e.g., user consent, court order, etc.), method of distribution (e.g., pushed, pulled, etc.) with respect to different classes of organizations or individuals.

The state distribution module 318 may distribute states of users to their respective user devices and relevant rules engines. The state of a user that is distributed to a rules engine may include one or more pieces of information that are relevant to the rules engine. For example, the state of a user that is distributed to a rules engine of a security system may include information such as identity of the user, absence or presence of any criminal history, absence or presence any restraining orders, etc. In various embodiments, the state distribution module 318 may use the carrier network 108, third-party networks, and/or carrier-operated hotspots (e.g., wireless access point 156) to disburse user states to the rules engines at multiple locations.

In some embodiments, the state distribution module 318 may monitor for events indicators from the rules engines, the user devices, as well as servers of the various governmental and private organizations. Accordingly, the state distribution module 318 may attempt to match an incoming event indicator against a master event schema. Thus, if the incoming event indicator matches an event in the master event schema, the state distribution module 318 may distribute the user state that is specified by the master event schema as being associated with the event.

The audit module 320 may respond to user requests for information regarding the distribution of user state information. For example, a user of the user device 102 may initiate an audit request via the privacy module 228. In turn, the audit module 320 may generate and distribute an audit report to the user device 102 for presentation by the privacy module 228. The audit report may list the specific information of the user that are collected by the stitch engine 112, the entities that received the state information, the nature and extent of the state information received by each organization, the times and dates of the state information release, and/or so forth.

Example Processes

FIGS. 4-7 present illustrative processes 400-700 for using data stitched from various data sources to determine whether a user of a user device is to be granted or denied access to one or more entities. Each of the processes 400-700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-700 are described with reference to the network architecture 100 of FIG. 1.

Figure 4:
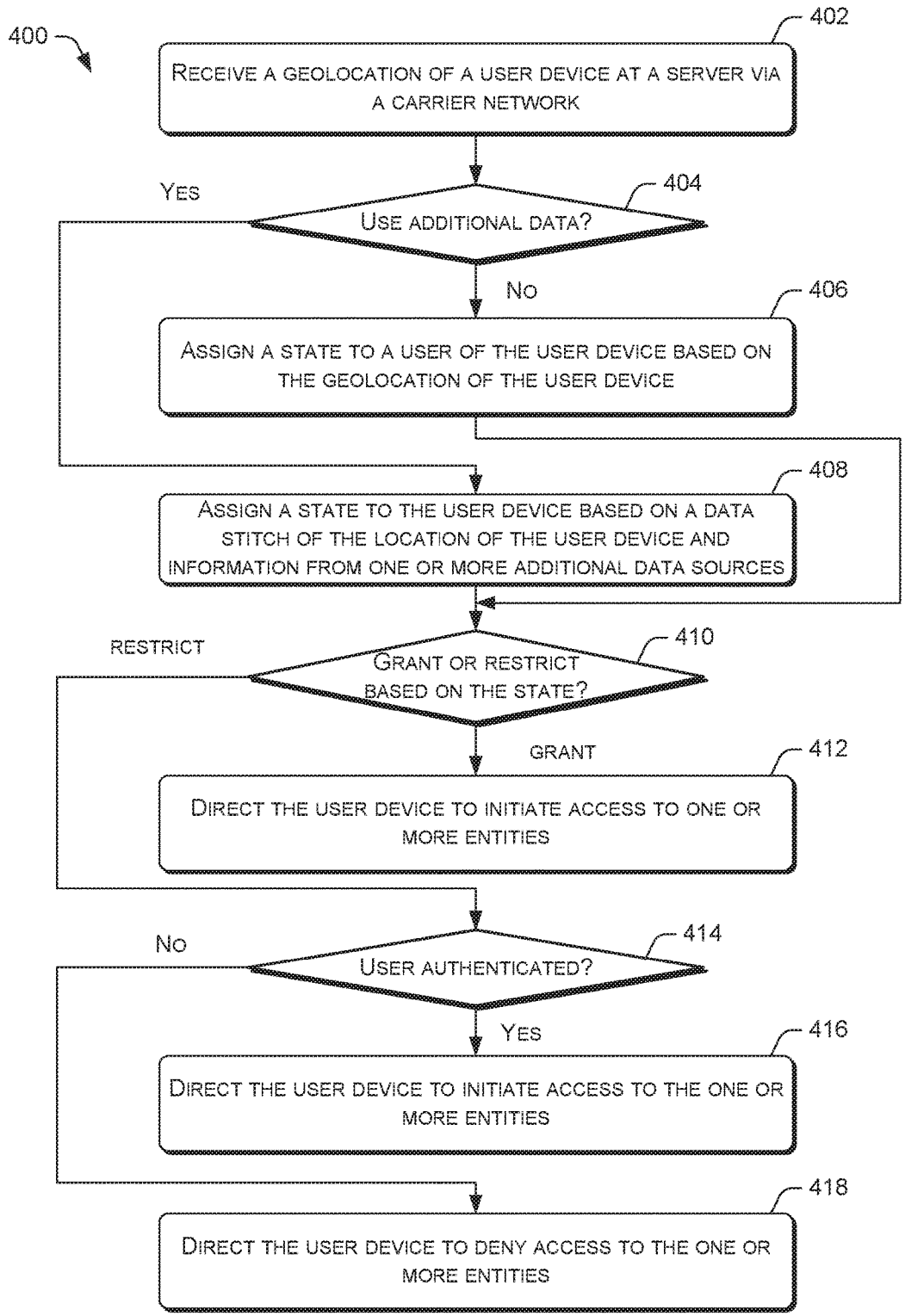
FIG. 4 is a flow diagram of an example process for granting or restricting access to one or more entities via a carrier network.

FIG. 4 is a flow diagram of an example process 400 for granting or restricting access to one or more entities via a carrier network. At block 402, one or more servers may receive a geolocation of a user device via a carrier network. The servers may be the servers 110 that are implementing the stitch engine 112. The carrier network may be the carrier network 108 operated by a telecommunication carrier 106. The position of the user device may be provided by a GPS sensor on the user device.

At decision block 404, the stitch engine 112 on the server may determine whether additional data from other data sources are to be used to determine a state for a user of the user device. Thus, if the stitch engine 112 determines that additional data is not to be used ("no" at decision block 404), the process 400 may proceed to block 406. At block 406, the stitch engine 112 may assign a state to the user of the user device based on the geolocation of the user device. Subsequently, the process 400 may proceed directly to decision block 410.

However, if the stitch engine 112 determines that additional data is to be used ("yes" at decision block 404), the process 400 may proceed to block 408. At block 408, the stitch engine 112 may assign a state to the user device based on the geolocation of the user device and information stitched from one or more additional data sources. In various embodiments, the additional data sources may include one or more data bases on telecommunication carriers 106, government agencies 116, and/or private organizations 118. The stitch engine 112 may aggregate the data from these data sources to provide a comprehensive multi-factor state of the user. Subsequently, the process 400 may proceed to decision block 410.

At decision block 410, the stitch engine 112 may determine whether to grant or restrict user access to one or more entities based on the state. In various embodiments, the one or more entities may include automation devices and/or resources. The automation devices may be devices that control physical access, lights, heating, ventilation, and air conditioning, (HVAC), etc. The resources may include software applications, documents, files, websites, and other forms of data. The one or more entities may reside on the user device or at a location that is proximate to the user device.

Accordingly, if the stitch engine 112 determines at decision block 410 that access is granted, the process 400 may proceed to block 412. At block 412, the stitch engine 112 may direct a user device to initiate access to one or more entities. For example, the stitch engine 112 may direct the agent application 138 on the user device 102 to send a command to an email application. The command may cause the email application to open up one or more emails that are stored on the user device 102 for viewing by the user 104.

In another example, the stitch engine 112 may direct the agent application 138 on the user device 102 to send a unlock command to electronic door lock of a residence that is proximate the user device 102. The command may cause the electronic door lock to unlock and provide user with access to the residence.

However, if the stitch engine 112 determines at decision block 410 that access is restricted, the process 400 may proceed to decision block 414. At decision block 414, the stitch engine 112 may determine whether the user of the user device may be authenticated for access. In some embodiments, the stitch engine 112 may perform the authentication based on authentication information previously provided by the user. In other embodiments, the user device may authenticate the user based on authentication information previously registered with the user device. The user device may then pass the authentication success or failure indication to the stitch engine 112. The authentication information may include passwords, pass codes, biometric data, and so forth.

Thus, if the stitch engine 112 determines that the user of the user device is authenticated ("yes" at decision block 414), the process 400 may continue to block 416. At block 416, the stitch engine 112 may direct an agent application (e.g., the agent application 138) on the user device to initiate access to the one or more entities. However, if the stitch engine 112 determines that the user of the user device is not authenticated ("no" at decision block 414), the process 400 may continue to block 418. At block 418, the stitch engine 112 may direct an agent application (e.g., the agent application 138) on the user device to deny access to the one or more entities.

In alternative embodiments, the decisions made by the stitch engine 112 at decision blocks 410 and 414 may be instead by the agent application 138. Accordingly, the stitch engine 112 may provide the state of the user to the agent application 138. In turn, the agent application 138 may perform blocks 410-418.

Figure 5:
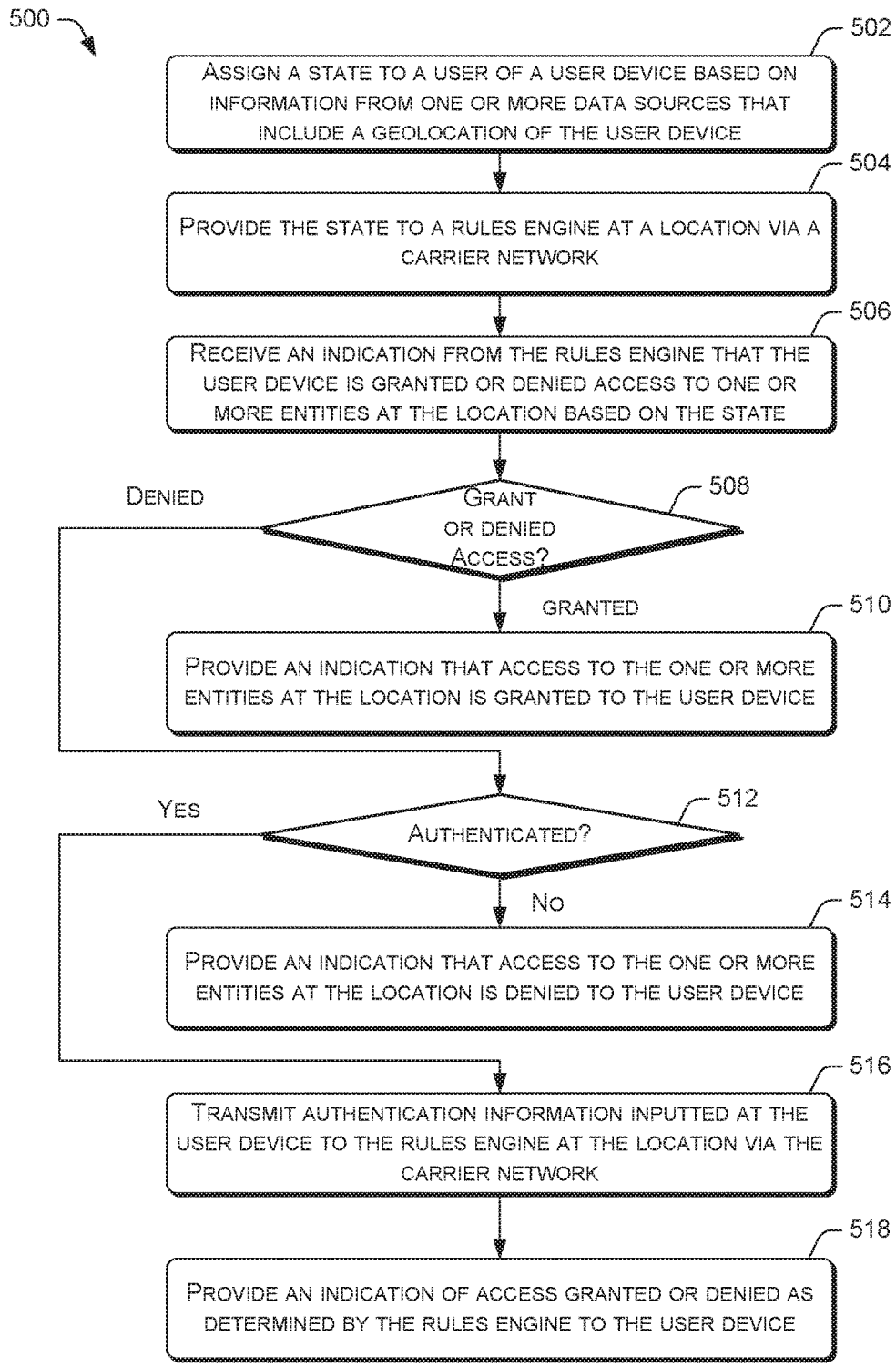
FIG. 5 is a flow diagram of an example process for providing stitched information to a rules engine at a location that determines whether access is to be granted or restricted.

FIG. 5 is a flow diagram of an example process 500 for providing stitched information to a rules engine at a location that determines whether access is to be granted or restricted. At block 502, the stitch engine 112 of the telecommunication carrier 106 may assign a state to a user of the user device based on information from one or more data sources. The stitch engine 112 may be implemented by the servers 110. The one or more data sources may include a geolocation of the user device. In various embodiments, the stitch engine 112 may perform this task using the steps that are outlined in the blocks 402-408 of the process 400. The state of the user may be relevant to actions that are to be taken by one or more rules engines that reside at various governmental and private entities.

At block 504, the stitch engine 112 may provide the state to a rules engine at a location via a carrier network. For example, the carrier network may be the carrier network 108 that is operated by the telecommunication carrier 106. However, in alternative embodiments, the stitch engine 112 may use a third-party network, or a combination of the carrier network and the third-party network, to provide the state to a rules engine.

At block 506, the stitch engine 112 may receive an indication from the rules engine. The indication may reflect that the user is either granted access or denied access to one or more entities at the location based on the state. In various embodiments, the one or more entities may include automation devices and/or resources. The automation devices may be devices that control physical access, lights, heating, ventilation, and air conditioning, (HVAC), etc. The resources may include software applications, documents, files, web sites, and other forms of data.

At decision block 508, if the stitch engine 112 determines that the indication shows the user is granted access based on the state, the process 500 may proceed to block 510. At block 510, the stitch engine 112 may provide the indication to the user device showing that access to the one or more entities at the location is granted. Once this indication reaches the user device, the indication may be displayed to the user via an agent application (e.g., the agent application 138) on the user device.

However, if the stitch engine 112 determines at decision block 508 that the indication shows the user denied access based on the state, the process 500 may proceed to decision block 512. At decision block 512, the stitch engine 112 may determine whether the rules engine has also indicated that the user of the user device may be further authenticated for access. Thus, if further authentication is not requested by the rules engine ("no" at decision block 512), the process 500 may proceed to block 514. At block 514, the stitch engine 112 may provide an indication to the user device showing that access to the one or more entities at the location is denied. Once this indication reaches the user device, the indication may be displayed to the user via an agent application (e.g., the agent application 138) on the user device.

However, if further authentication is requested by the rules engine ("yes" at decision block 512), the process 500 may proceed to block 516. At block 516, the stitch engine 112 may relay a request for authentication information from the rules engine to the user device. Further, the stitch engine 112 may further relay any authentication information that is manually entered by the user at the user device to the rules engine. In turn, the rules engine may authenticate the user based on authentication information previously registered with the user device. The authentication information may include passwords, pass codes, biometric data, and so forth. Further, if the authentication is successful, the rules engine may provide the user with access to the one or more entities. Subsequently, the rules engine may further provide an authentication success or failure indication to the stitch engine 112.

At block 518, the stitch engine 112 may provide the indication of access granted or denied as determined by the rules engine to the user device. Once this indication reaches the user device, the indication may be displayed to the user via an agent application (e.g., the agent application 138) on the user device.

Figure 6:
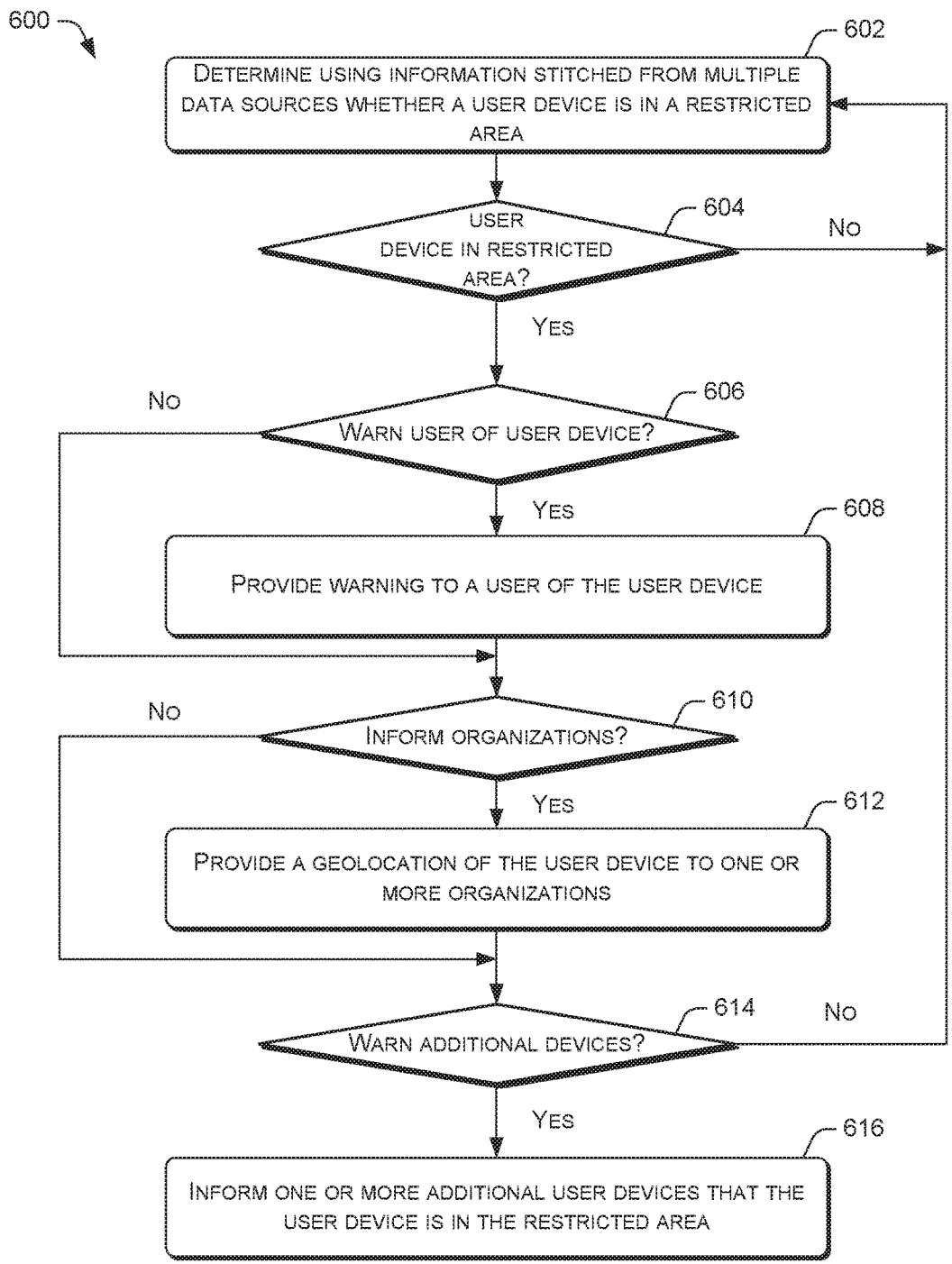
FIG. 6 is a flow diagram of an example process for initiating corrective actions when stitched information from multiple data sources indicate that a user device is in a restricted area.

FIG. 6 is a flow diagram of an example process 600 for initiating corrective actions when stitched information from multiple data sources indicate that a user device is in a restricted area. At block 602, the stitch engine 112 of the telecommunication carrier 106 may determine using information stitched from multiple data sources whether a user device is in a restricted area. For example, the information may include a geolocation of the user device. The information may further include a corporate database of access privileges for the device user, or a governmental database showing that the user is barred from approaching certain other users or particular places.

Accordingly, if the stitch engine 112 determines at decision block 604 that the user device is not in a restricted area ("no" at decision block 604), the process 600 may return to block 602. However, if the stitch engine 112 determines at decision block 604 that the user device is in a restricted area ("yes" at decision block 604), the process 600 may proceed to decision block 606.

At decision block 606, the stitch engine 112 may determine based on preset configurations whether the user of the user device is to be warned. Thus, if the stitch engine 112 is configured to warn the user of the user device ("yes" at decision block 606), the process 600 may proceed to block 608. At block 608, the stitch engine may provide a warning to the user of the user device that the user is in a restricted area. In various embodiments, the warning may be displayed by an agent application (e.g., the agent application 138) on the user device. Subsequently, the process 600 may continue to decision block 610. However, if the stitch engine is not configured to warn the user of the user device ("no" at decision block 606), the process 600 may proceed directly to decision block 610.

At decision block 610, the stitch engine may determine based on preset configurations whether one or more organizations are to be informed of the trespass by the user of the user device. In various embodiments, the organizations may include a government agency (e.g., a law enforcement agency) and/or a private firm, such as a business that prohibits the user from entering the restricted area. Thus, if the stitch engine 112 is configured to warn the one or more organizations ("yes" at decision block 610), the process 600 may proceed to block 612. At block 612, the stitch engine may provide a warning to the one or more organizations that the user is in a restricted area. For example, a law enforcement agency may be warned that the user is in close proximity to another user in violation of a restraining order. Subsequently, the process 600 may continue to decision block 614. However, if the stitch engine 112 is configured to not warn the one or more organizations ("no" at decision block 610), the process 600 may proceed directly to decision block 614.

At decision block 614, the stitch engine may determine based on preset configurations whether one or more additional user devices are to be warned. Thus, if the stitch engine 112 is configured to warn the one or more additional devices ("yes" at decision block 614), the process 600 may proceed to block 616. At block 616, the stitch engine may provide a warning to the one or more additional user devices that the user of the user device is in a restricted area. In various embodiments, the warning may be displayed by an agent application on the respective additional user devices. However, if the stitch engine is not configured to warn the one or more additional user devices ("no" at decision block 614), the process 600 may loop back to block 602.

Figure 7:
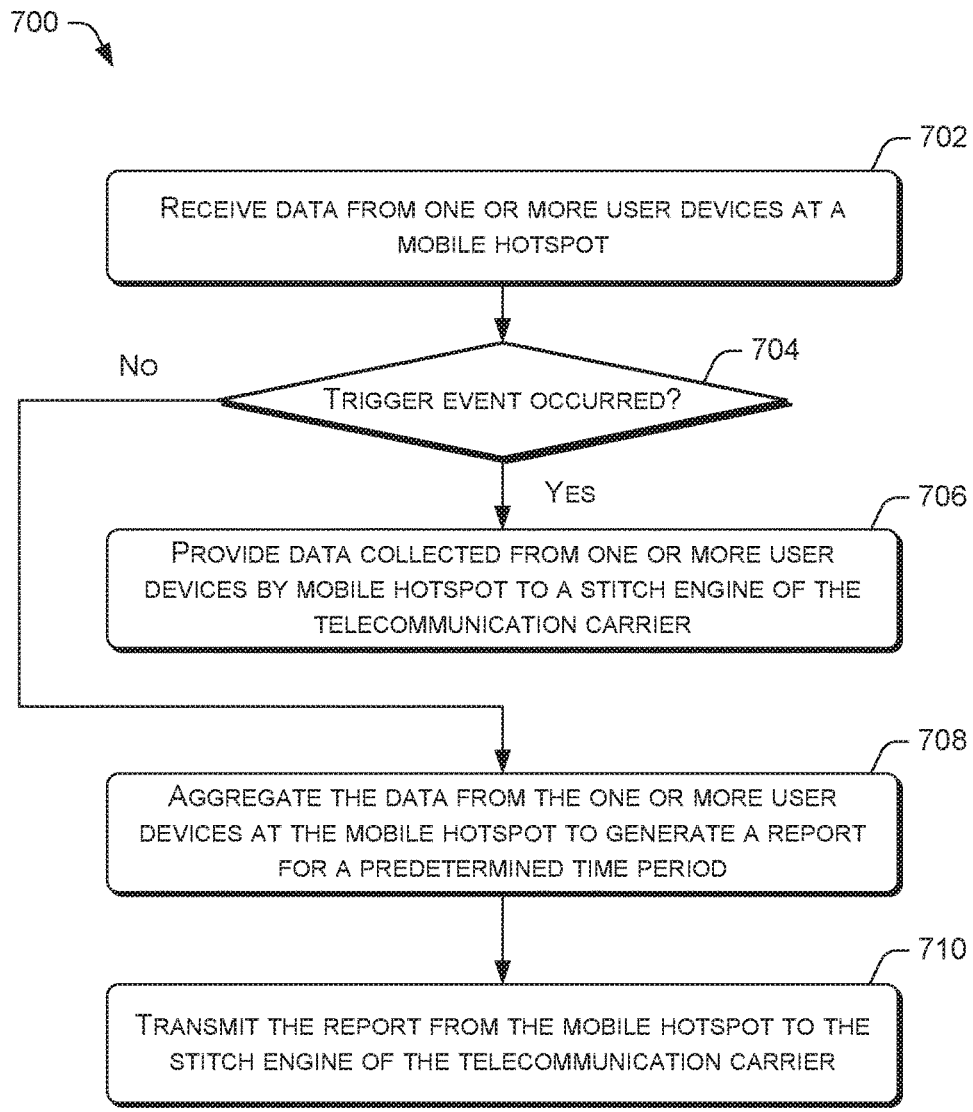
FIG. 7 is a flow diagram of an example process for a mobile hotspot to report data collected from user devices.

FIG. 7 is a flow diagram of an example process 700 for a mobile hotspot to report data collected from user devices. At block 702, a mobile hotspot, such as the wireless access point 156, may receive data from one or more user devices. In various embodiments, the mobile hotspot may be configured to provide telecommunication and data communication services through the telecommunication carrier 106. The mobile hotspot may be equipped with an authentication certificate that indicates the wireless access point is a trusted device to the telecommunication carrier 106. The mobile hotspot may receive data as one or more user devices interact with rules engines that are serviced by the mobile hotspot. The data may include identification information on the one or more user devices that are communicating with the mobile hotspot, internet protocol addresses of the servers that exchanged data with the user devices, amount of data that are exchanged between the user devices and the servers, times and durations of the data exchanges, and/or so forth.

At decision block 704, the mobile hotspot may determine whether a trigger event occurred. In various embodiments, a trigger event may include a prompt from a rules engine, a power interruption to the user device, a detected attempted to hack a firewall of the mobile hotspot, etc. For example, a rules engine of security system may send a trigger signal to the mobile hotspot in the event of a security alarm. Thus, if the mobile hotspot determines that a trigger event occurred ("yes" at decision block 704), the process 700 may proceed to block 706. At block 706, the mobile hotspot may provide the data that is collected from the one or more user devices by the mobile hotspot to the stitch engine 112 of the telecommunication carrier 106. For example, upon the prompt from the rules engine of the security system, the mobile hotspot may send identification information of the one or more user devices that are communicating with the mobile hotspot at the time of the alarm to the stitch engine 112.

However, if no trigger event occurs ("no" at decision block 704), the process 700 may proceed to block 708. At block 708, the mobile hotspot may aggregate the data from the one or more user devices to generate a report for a predetermined time period. For example, the report may include information such as the identities of the user devices that are connected to the mobile hotspot, geolocation of the user devices, average length of connection to the mobile hotspot, average amount of data exchange per a time period by each user device, and/or so forth.

At block 710, the mobile hotspot may transmit the report to the stitch engine 112 of the telecommunication carrier 106. In various embodiments, the mobile hotspot may perform the data collection, aggregation, and reporting activities upon receiving explicit permission from a subscriber that pays for the usage of the mobile hotspot. For example, the subscriber may log onto a user interface page provided by the wireless access point 156 to give permission for the wireless access point 156 to perform such activities.

The techniques may enable a telecommunication carrier to act as an information aggregator and distributor for device users. By aggregating information from multiple data sources, analyzing the information, and distributing the analyzed information to multiple entities, the telecommunication carrier may support various forms of automations. These forms of automation may include machine-to-machine automation, automated access control, and automated alerts. These forms of automations may provide additional convenience as the device users perform daily tasks. These forms of automation may also shelter the device users from harm, as well as protect individuals or organizations that encounter the device users.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
assigning a state to a user of a user device at a telecommunication carrier based at least on a data stitch of information from multiple data sources and a type of data registered in advance to be received by a rules engine at a remote location, the multiple data sources including data on a geolocation of the user device, wherein different types of states are assigned to different classes of rules engines;

providing, via a carrier network of the telecommunication carrier, the state to the rules engine at the remote location;

receiving, via the carrier network, an indication from the rules engine that the user is granted or denied access to one or more entities at the remote location based at least on the state; and providing, via the carrier network, the indication of granted or denied access to the user device of the user.

2. The computer-implemented method of claim 1, further comprising:

sending, via the carrier network, a request for an input of authentication information from the user on behalf of the rules engine following the user being denied access to the one or more entities by the rules engine;

providing, via the carrier network, the authentication information of the user to the rules engine;

receiving, via the carrier network, an additional indication from the rules engine that the user device is granted access to the one or more entities in response to the rules engine determining that the authentication information is valid; and providing, via the carrier network, the additional indication of the granted access to the user device of the user.

3. The computer-implemented method of claim 1, further comprising receiving, via the carrier network, the information from at least one of a database of another telecommunication carrier, a database of a government agency, or a database of a private firm.

4. The computer-implemented method of claim 1, further comprising receiving, via the carrier network, the geolocation of the user device from a mobile hotspot at the remote location, the geolocation being received at an occurrence of a trigger event at the remote location or as a portion of a periodic data report aggregated by the mobile hotspot.

5. The computer-implemented method of claim 1, further comprising:

receiving, via the carrier network, an additional geolocation of the user device; and sending the additional geolocation of the user device to a financial institution to repudiate a transaction that occurred at a location that is different from the additional geolocation.

6. The computer-implemented method of claim 1, wherein the one or more entities include at least one of an automation device that responds to remote control from the rules engine, or a data resource that comprises a document, an email, a file, or a website.

7. The computer-implemented method of claim 1, wherein assigning a state to the user includes determining that the user is in a restricted area based at least on the data stitch of the information from the multiple data sources.

8. The computer-implemented method of claim 7, further comprising in response to determining that the user is in the restricted area, performing, via the carrier network, at least one of sending a warning to the user device of the user indicating that the user is in the restricted area, providing a geolocation of the user device to one or more organizations, or informing one or more additional user devices that the user device is in the restricted area.

9. The computer-implemented method of claim 8, wherein providing the geolocation include providing the geolocation of the user device to at least one of a law enforcement agency or a private firm that controls access to the restricted area.

10. One or more non-transitory computer-readable media storing computer-executable instructions that upon execution cause one or more processors to perform acts comprising:

receiving, via a carrier network, information from multiple data sources that include a database of a telecommunication carrier that at least stores a geolocation of a user device;

assigning a state to a user of the user device based at least on a data stitch of the information from the multiple data sources that includes the geolocation of the user device and a type of data registered in advance to be received by a rules engine at a remote location, wherein different types of states are assigned to different classes of rules engines;

providing, via the carrier network, the state to the rules engine at the remote location;

receiving, via the carrier network, an indication from the rules engine that the user is granted or denied access to one or more entities at the remote location based at least on the state; and providing, via the carrier network, the indication of granted or denied access to the user device of the user.

11. The one or more non-transitory computer-readable media of claim 10, wherein the acts further comprise:

sending, via the carrier network, a request for an input of authentication information from the user on behalf of the rules engine following the user being denied access to the one or more entities by the rules engine;

providing, via the carrier network, the authentication information of the user to the rules engine;

receiving, via the carrier network, an additional indication from the rules engine that the user device is granted access to the one or more entities in response to the rules engine determining that the authentication information is valid; and providing, via the carrier network, the additional indication of the granted access to the user device of the user.

12. The one or more non-transitory computer-readable media of claim 10, where the acts further comprise:

receiving, via the carrier network, an additional geolocation of the user device; and sending the additional geolocation of the user device to a financial institution to repudiate a transaction that occurred at a location that is different from the additional geolocation.

13. The one or more non-transitory computer-readable media of claim 10, wherein the receiving includes receiving the geolocation of the user device from a mobile hotspot at the remote location, the geolocation being received at an occurrence of a trigger event at the remote location or as a portion of a periodic data report aggregated by the mobile hotspot.

14. The one or more non-transitory computer-readable media of claim 10, wherein the one or more entities include at least one of an automation device that responds to remote control from the rules engine, or a data resource that comprises a document, an email, a file, or a website.

15. The one or more non-transitory computer-readable media of claim 10, wherein the assigning the state to the user includes determining that the user is in a restricted area based at least on the data stitch of the information from the multiple data sources.

16. The one or more non-transitory computer-readable media of claim 15, wherein the acts further comprise in response to determining that the user is in the restricted area, performing, via the carrier network, at least one of sending a warning to the user device of the user indicating that the user is in the restricted area, providing a geolocation of the user device to one or more organizations, or informing one or more additional user devices that the user device is in the restricted area.

17. The one or more non-transitory computer-readable media of claim 16, wherein providing the geolocation include providing the geolocation of the user device to at least one of a law enforcement agency or a private firm that controls access to the restricted area.

18. A computing device, comprising:
one or more processors; and
memory having instructions stored therein, the instructions, when executed by the one or more processors, cause the one or more processors to perform acts comprising:
   receiving, via a carrier network, information from multiple data sources that include a database of a telecommunication carrier that at least stores a geolocation of a user device;
   assigning a state to a user of the user device based at least on a data stitch of the information from the multiple data sources that includes the geolocation of the user device and a type of data registered in advance to be received by a rules engine at a remote location, wherein different types of states are assigned to different classes of rules engines;
   providing, via the carrier network, the state to the rules engine at the remote location;
   receiving, via the carrier network, an indication from the rules engine that the user is granted or denied access to one or more entities at the remote location based at least on the state; and
   providing, via the carrier network, the indication of granted or denied access to the user device of the user.

19. The computing device of claim 18, wherein the acts further comprise:
   sending, via the carrier network, a request for an input of authentication information from the user on behalf of the rules engine following the user being denied access to the one or more entities by the rules engine;
   providing, via the carrier network, the authentication information of the user to the rules engine;
   receiving, via the carrier network, an additional indication from the rules engine that the user device is granted access to the one or more entities in response to the rules engine determining that the authentication information is valid; and
   providing, via the carrier network, the additional indication of the granted access to the user device of the user.

20. The computing device of claim 18, wherein the receiving includes receiving the geolocation of the user device from a mobile hotspot at the remote location, the geolocation being received at an occurrence of a trigger event at the remote location or as a portion of a periodic data report aggregated by the mobile hotspot.

* * * * *